United States Patent
Lu et al.

(10) Patent No.: US 9,038,979 B2
(45) Date of Patent: May 26, 2015

(54) MULTIFUNCTIONAL CASE FOR PORTABLE ELECTRONIC DEVICE

(75) Inventors: Li-Houng Lu, Tu-Cheng (TW);
Hsin-Yung Yang, Tu-Cheng (TW);
Ching-Min Lin, Tu-Cheng (TW);
Tzu-Cheng Yu, Santa Clara, CA (US)

(73) Assignee: Chi Mei Communication Systems, Inc., New Taipei (TW)

( * ) Notice: Subject to any disclaimer, the term of this patent is extended or adjusted under 35 U.S.C. 154(b) by 808 days.

(21) Appl. No.: 13/036,116

(22) Filed: Feb. 28, 2011

(65) Prior Publication Data
US 2012/0146466 A1  Jun. 14, 2012

(30) Foreign Application Priority Data
Dec. 13, 2010  (TW) ................................ 99143489 A (51) Int. Cl.
*A47G 29/00* (2006.01)
*G06F 1/16* (2006.01)
(Continued)

(52) U.S. Cl.
CPC ............ *G06F 1/1626* (2013.01); *A45C 7/0036* (2013.01); *A45C 11/00* (2013.01); *A45C 2011/001* (2013.01); *A45C 2011/002* (2013.01); *A45C 2011/003* (2013.01); *F16M 11/38* (2013.01); *F16M 13/00* (2013.01); *G06F 1/1628* (2013.01)

(58) Field of Classification Search
USPC ......... 248/454, 459, 460, 463, 455, 456, 458, 248/465, 165, 166, 176.1; 361/679.01; 455/348, 95, 100, 90.3; 379/185, 412, 379/447, 446, 440; 40/530; 190/1, 10, 11, 190/12 R, 12 A; 220/628, 629, 630, 23.83, 220/23.86; 108/43, 1, 44; 206/320, 762, 206/45.24
See application file for complete search history.

(56) References Cited

U.S. PATENT DOCUMENTS

| 1,092,321 A | * | 4/1914 | Wiplitzhauser | ............... 446/488 |
| 1,370,279 A | * | 3/1921 | Burzynski | ....................... 211/43 |

(Continued)

FOREIGN PATENT DOCUMENTS

| JP | 1981067468 A | 6/1981 |
| WO | 2010/036090 A2 | 4/2010 |

OTHER PUBLICATIONS

Squirrel, "Origami IPAD Sleeve From Incase," Gaygadget (Nov. 4, 2010).
(Continued)

*Primary Examiner* — K Wood
(74) *Attorney, Agent, or Firm* — Novak Druce Connolly Bove + Quigg LLP (57) ABSTRACT

A multifunctional case is configured for receiving or supporting a portable electronic device. The case includes a first layer and a second layer. The second layer is connected to the first layer by the edges. A receiving space is formed between the first and second layers for receiving the portable electronic device. The second layer is provided with a base portion, a main supporting portion, two side supporting portions and two remaining portions are formed on the second layer. The two side supporting portions and the remaining portions are symmetrically positioned at two sides of the main supporting portion. When the case is folded up as a support, the main supporting portion is angled with the base portion. The remaining portions are stacked on the base portion. The side supporting portions are perpendicular to the remaining portions and the main supporting portion.

15 Claims, 7 Drawing Sheets

(51) Int. Cl.
*A45C 7/00* (2006.01)
*A45C 11/00* (2006.01)
*F16M 11/38* (2006.01)
*F16M 13/00* (2006.01)

(56) References Cited

U.S. PATENT DOCUMENTS

| | | | | | |
|---|---|---|---|---|---|
| 3,097,444 | A | * | 7/1963 | Steiner | 248/454 |
| 4,318,527 | A | * | 3/1982 | Smith | 248/459 |
| 4,919,982 | A | * | 4/1990 | Hayes | 428/34.2 |
| 5,165,649 | A | * | 11/1992 | Neumann et al. | 248/459 |
| 8,393,464 | B2 | * | 3/2013 | Yang et al. | 206/45.2 |
| 8,544,639 | B2 | * | 10/2013 | Yang et al. | 206/45.2 |
| 2006/0285283 | A1 | * | 12/2006 | Simonian et al. | 361/679 |
| 2012/0043234 | A1 | * | 2/2012 | Westrup | 206/320 |
| 2012/0181195 | A1 | * | 7/2012 | Lu et al. | 206/320 |
| 2012/0211613 | A1 | * | 8/2012 | Yang et al. | 248/174 |
| 2012/0248277 | A1 | * | 10/2012 | Yang et al. | 248/346.3 |
| 2013/0284866 | A1 | * | 10/2013 | Lee | 248/188.6 |

OTHER PUBLICATIONS

Incase,"Introducing the Convertibel Magzine Jacket for ipad", Incase website(Nov. 23, 2010).

* cited by examiner

MULTIFUNCTIONAL CASE FOR PORTABLE ELECTRONIC DEVICE

CROSS-REFERENCE TO RELATED APPLICATIONS

This application is related to co-pending U.S. patent application Ser. No. 13/082,546, entitled "MULTIFUNCTIONAL CASE FOR PORTABLE ELECTRONIC DEVICE". Such applications have the same assignee as the present application. The above-identified applications are incorporated herein by reference.

BACKGROUND

Technical Field

This disclosure relates to cases for portable electronic devices, particularly, to a multifunction case for protecting and supporting portable electronic devices.

On one hand, cases are widely applied to protect portable electronic devices. On another hand, users generally need a holder for supporting the portable electronic device to read an eBook or watch video. However, it can be difficult to carry the case and the holder at the same time. In many cases, the holder can be easily left behind after use.

Therefore, there is room for improvement within the art.

BRIEF DESCRIPTION OF THE DRAWINGS

Many aspects of the multifunctional case can be better understood with reference to the following drawings. The components in the drawings are not necessarily drawn to scale, the emphasis instead being placed upon clearly illustrating the principles of the multifunctional case.

DETAILED DESCRIPTION

Figure 1:
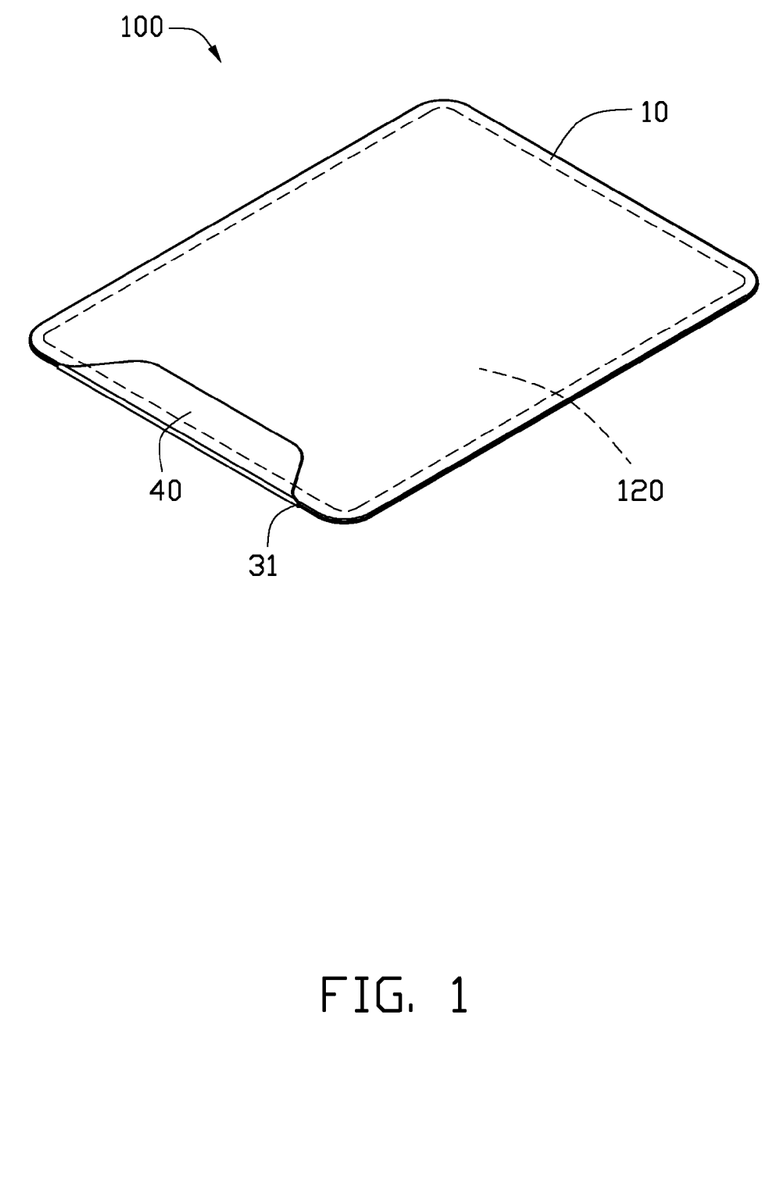
FIG. 1 is an isometric view of a multifunctional case, in accordance with an exemplary embodiment.
Figure 5:
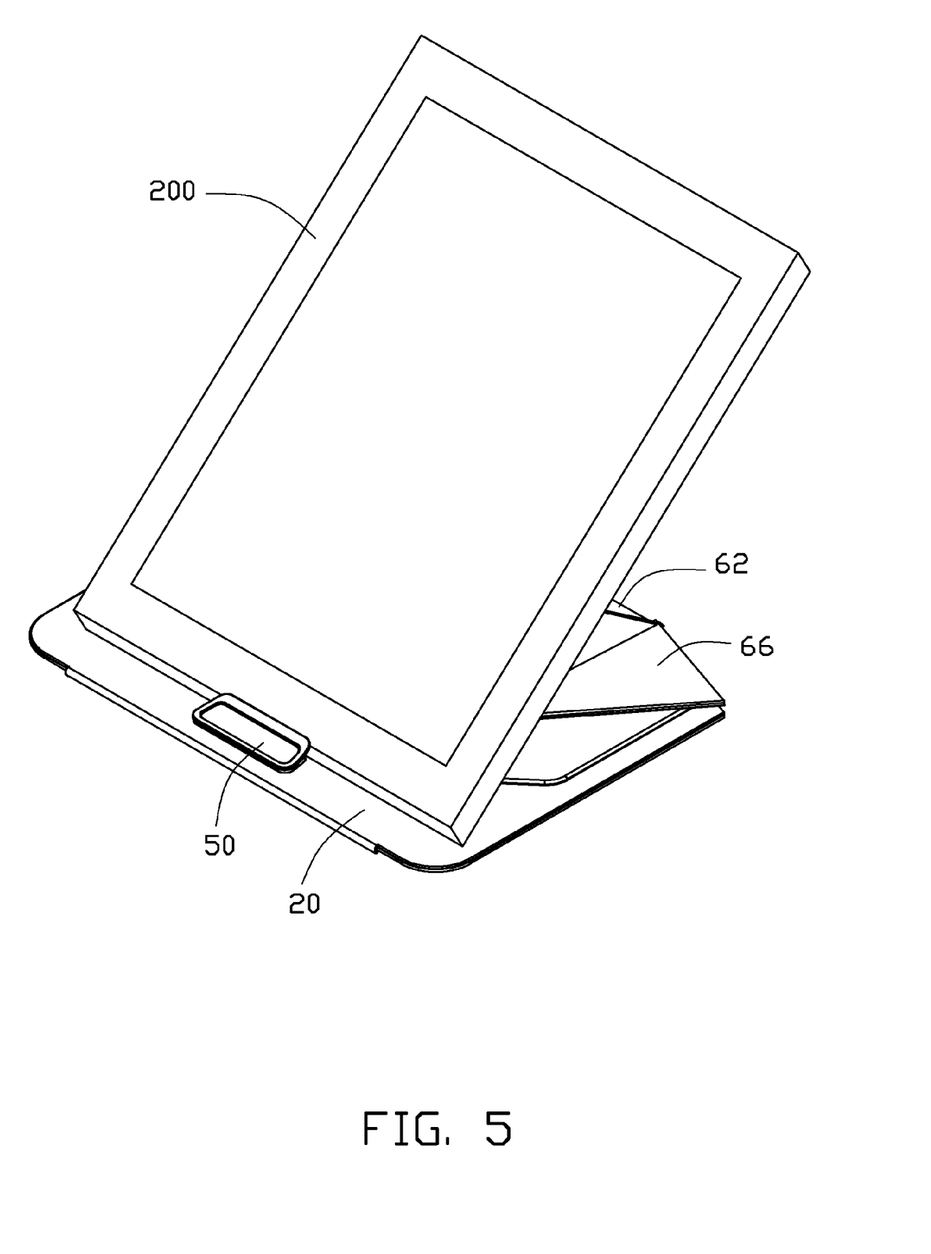
FIG. 5 is similar to FIG. 4, showing a portable electronic device supported by the multifunctional case.

FIGS. 1 and 5 show an exemplary embodiment of a multifunctional case 100. The case 100 is selectively used to receive or support an portable electronic device 200.

Figure 2:
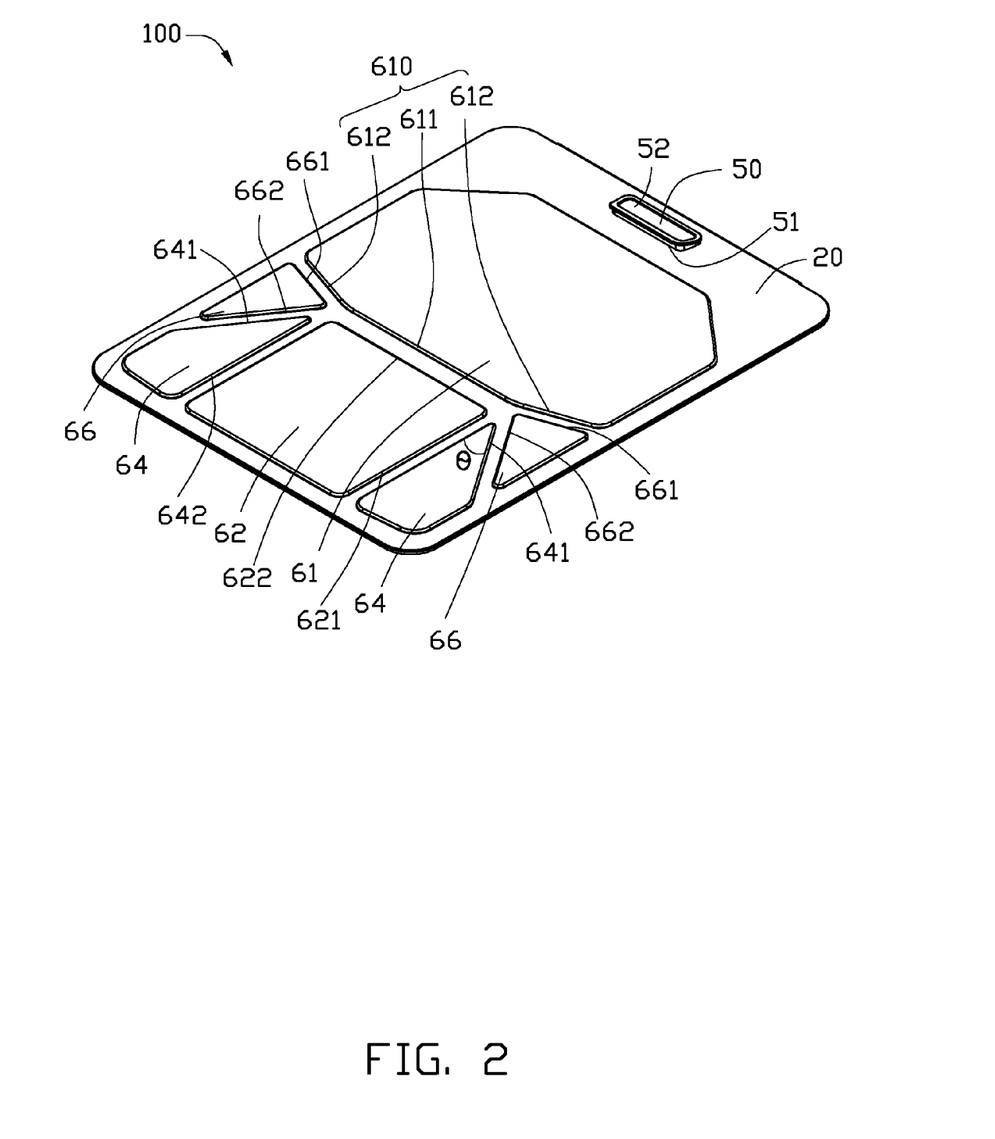
FIG. 2 is similar to FIG. 1, but shown from another aspect.

Also referring to HG 2, the case 100 includes a first layer 10, a second layer 20 and a closing piece 40. A receiving space 120 is defined between the first layer 10 and the second layer 20 for receiving the portable electronic device 200. The first layer 10 and the second layer 20 are connected to each other by their edges, leaving an opening 31 that allows the portable electronic device 200 to be inserted into the receiving space 120. The first and second layers 20 are made of soft material, e.g., fiber, cotton, vinyl, thermoplastics.

The closing piece 40 is flexible and is used to close the opening 31. The closing piece 40 may extend from the second layer 20 to adjacent to the opening 31.

A locking member 50, a main supporting portion 62, two side supporting portions 64 and two retaining portions 66 are formed on the second layer 20. The locking member 50 is positioned adjacent to the opening 31. The locking member 50 includes a head 52, and a slot 51 formed between the second layer 20 and the head 52 for receiving one end of the portable electronic device 200.

The portions 61, 62, 64, 66 cover most of the outer surface of the second layer 20 and are separate from each other. The portions 61, 62, 64, 66 are symmetrically positioned relative to a longitudinal center line of the second layer 20. The base portion 61 is positioned adjacent to the locking member 50 and includes a baseline 610 at one edge thereof. The baseline 610 includes a middle portion 611 and two end portions 612. The two end portions 612, 613 are folded toward the locking member 50. The main supporting portion 62 is rectangular and faces the middle portion 611 of the base portion 61. The main supporting portion 62 has two side edges 621 and two end edges 622. The edges 622 are parallel to the middle portion 611 of the baseline 610.

The two side supporting portions 64 are respectively positioned at two sides of the main supporting portion 62. Each side supporting portion 64 includes a sloping edge 641 and a bottom edge 642. The sloping edge 641 is obliquely angled with respect to the bottom edge 642. An angle $\theta$ between the sloping edge 641 and the bottom edge is about 30 degrees to about 60 degrees. The bottom edge 642 is adjacent to and parallel to one of the side edges 621 of the main supporting portion 62.

The retaining portion 66 is positioned between the base portion 61 and the corresponding side supporting portion 64. Each retaining portion 66 includes a first edge 661 and a second edge 662. The first edge 661 is adjacent to and parallel to the corresponding end portion 612 of the base portion 61. The second edge 662 is adjacent to and parallel to the sloping edge 641 of the corresponding side supporting portion 64.

Figure 3:
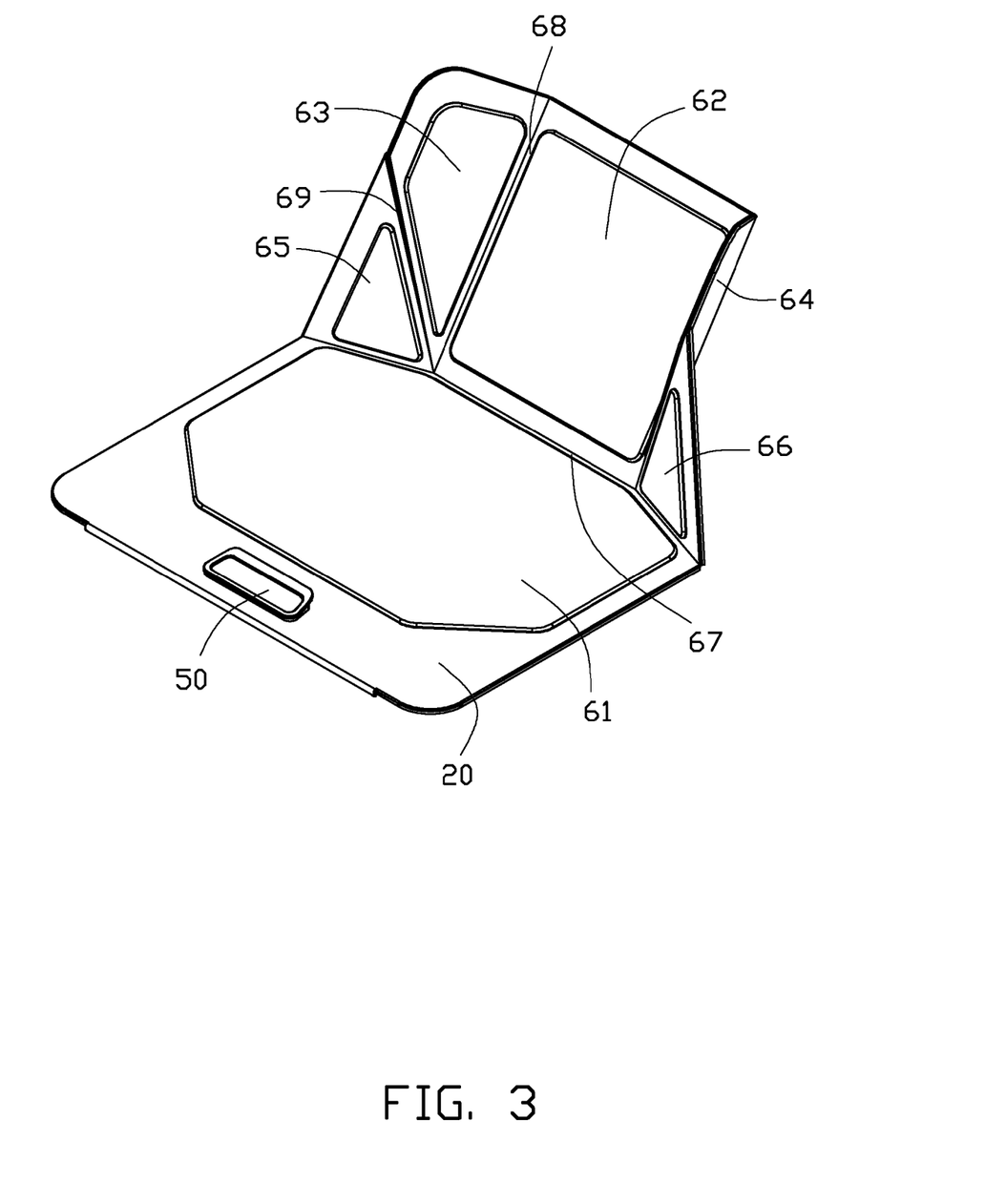
FIG. 3 is similar to FIG. 2, showing the multifunctional case in a state of being folded.

Referring to FIG. 3, the space between the retaining portions 66 and the base portion 61 and the space between the main supporting portion 62 and the base portion 61 together form a first folding area 67. A space between the side supporting portion 64 and the main supporting portion 62 forms a second folding area 68. A space between the side supporting portion 64 and the retaining portion 66 forms a third folding area 69.

Figure 4:
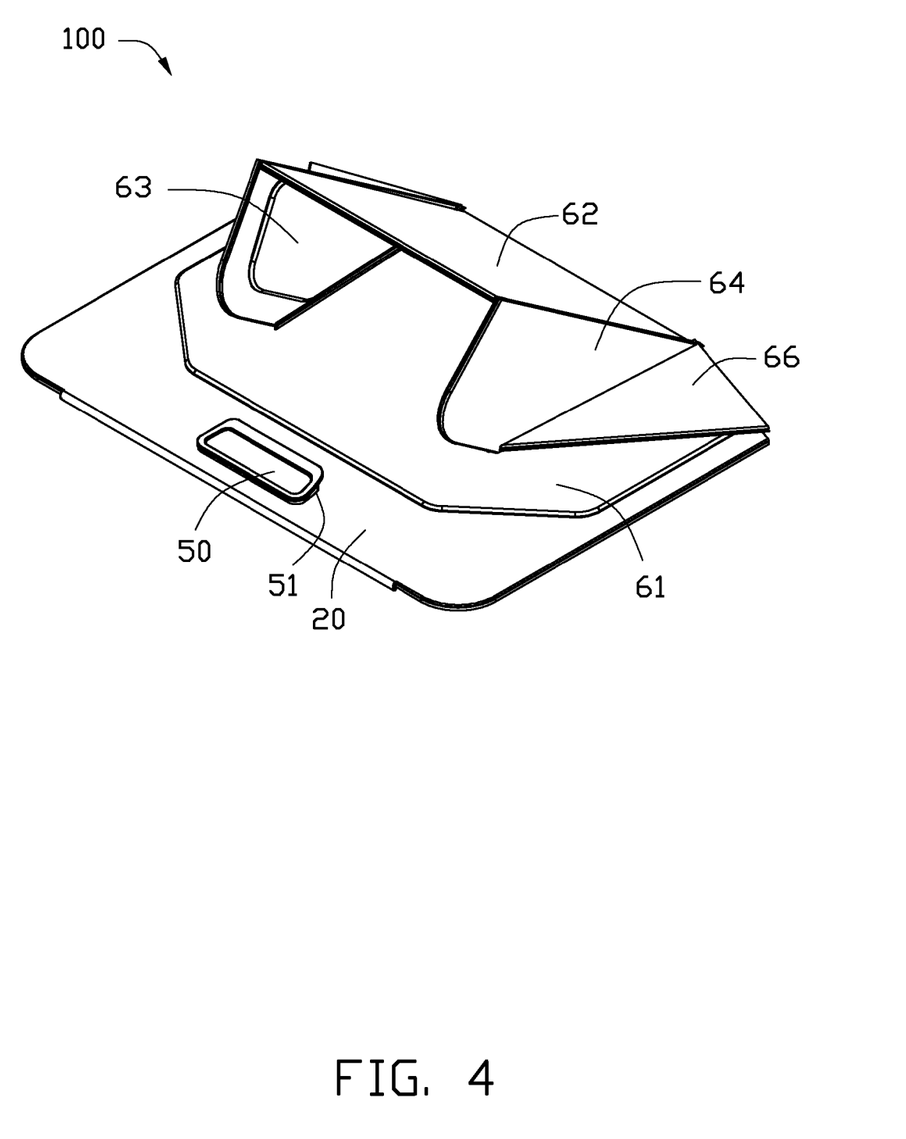
FIG. 4 is similar to FIG. 3, showing the multifunctional case folded as a support.

Also referring to FIG. 4, to fold the case 100 to be a support, the retaining portions 66 and the main supporting portion 62 are folded toward the base portion 61 along the first folding area 67. The two retaining portions 66 are positioned on the base portion 61, bringing the side supporting portions 64 to rotate relative to the second and third folding areas 69 at the same time. At last, the side supporting portions 64 are perpendicular to the base portion 61 and the main supporting portion 62. The main supporting portion 62 is at an angle $\theta$ with the base portion 61.

Referring to FIG. 5, the portable electronic device 200 is set on the case 100 as a support. On end of the portable electronic device 200 is locked in the slot 51 of the locking member 50. The portable electronic device 200 is supported by the main supporting portions 62 and the side supporting portions 64 at an angle. Thus, users can comfortably view the display of the portable electronic device 200.

Figure 6:
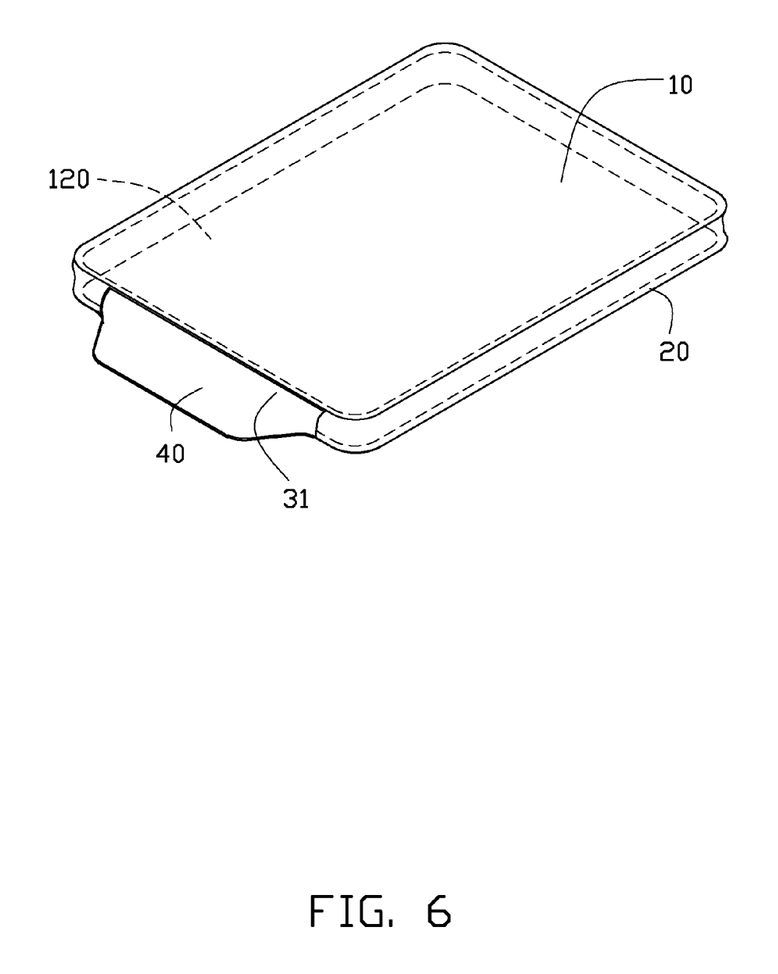
FIG. 6 is similar to FIG. 1, showing the multifunctional case receiving a portable electronic device therein.

Referring to FIG. 6, after viewing the display of the device 200, the closing piece 40 is opened to expose the opening 31. The device 200 is inserted into the receiving space 120 of the case 100 via the opening 31.

Figure 7:
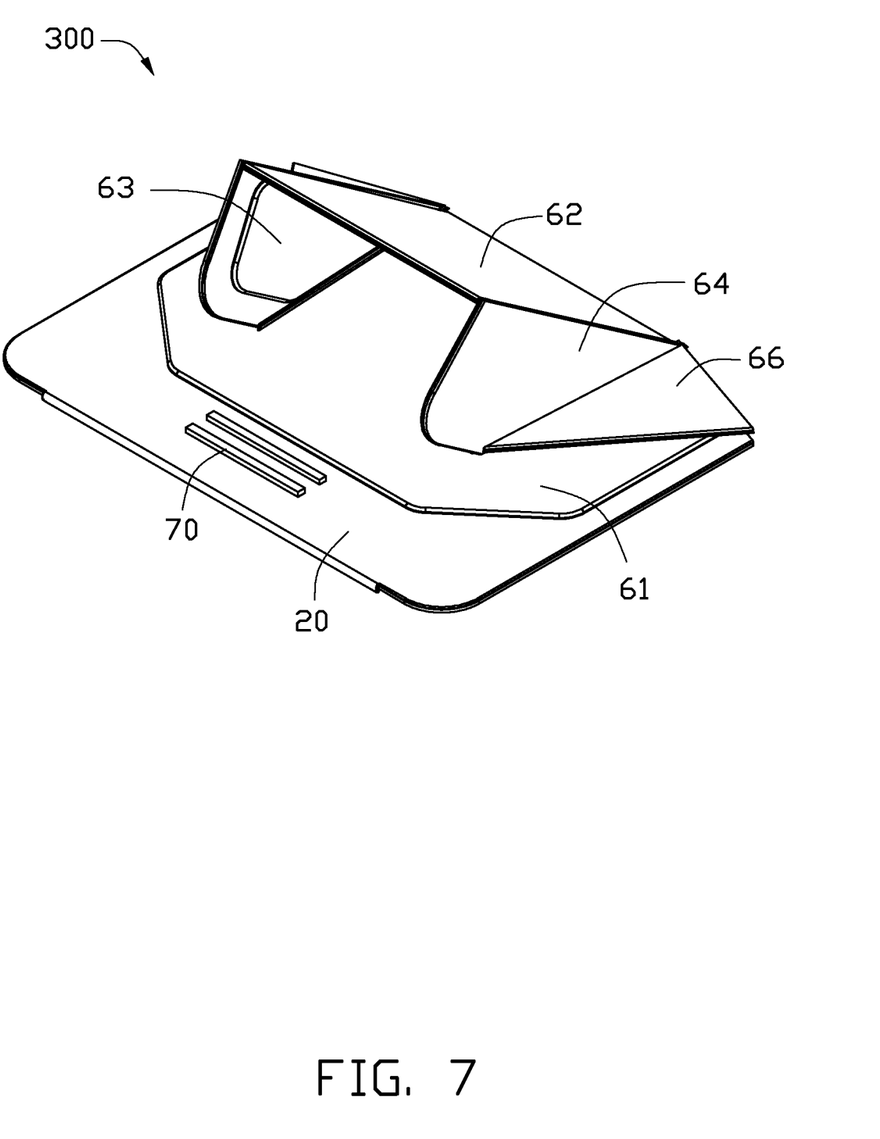
FIG. 7 is an isometric view of another multifunctional case, in accordance with another exemplary embodiment.

FIG. 7 shows another exemplary embodiment of a multifunctional case 100. The structure of the case 300 is similar to case 100 except that a plurality of parallel bars 70 are protruding from the second layer 20 to replace the locking member 50. The bars 70 are spaced from each other. Thus, users can select one of the bars 70 to resist the device 200 to select the angle for viewing the display.

It is to be understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A multifunctional case for receiving or supporting a portable electronic device, comprising:
    a first layer; and
    a second layer connected to the first layer at edges, a receiving space formed between the first and second layers for receiving the portable electronic device; the second layer provided with a base portion, a main supporting portion, two side supporting portions and two retaining portions; the two side supporting portions and the retaining portions symmetrically positioned at two sides of the main supporting portion;
    when the case is folded up as a support, the first layer and the second are together folded, the retaining portions are stacked on the base portion, and the side supporting portions are perpendicular to the retaining portions and the main supporting portion, and the main supporting portion is at an acute angle with the base portion;
    wherein the base portion includes a baseline, the baseline includes a middle portion and two end portions, and the main supporting portion includes an end edge adjacent to and parallel with the middle portion, the retaining portion includes a first edge adjacent to and parallel with the end portion of the baseline;
    a first folding area is formed between the base portion and the main supporting portion; a second folding area is formed between each side supporting portion and the main supporting portion; and a third folding area is formed between each pair of the side supporting portion and the retaining portion.

2. The multifunctional case as claimed in claim 1, wherein an opening is formed to communicate to the receiving space, allowing the portable electronic device to be inserted into the receiving space.

3. The multifunctional case as claimed in claim 1, wherein the retaining portion further includes a second edge, and the side supporting portion includes a sloping edge adjacent to and parallel with the second edge.

4. The multifunctional case as claimed in claim 3, wherein the side supporting portion further includes a bottom edge, and the main supporting portion further includes a side edge adjacent to and parallel with the bottom edge.

5. The multifunctional case as claimed in claim 4, wherein an angle between the sloping edge and the bottom edge is selected from 30 degree to 60 degree.

6. The multifunctional case as claimed in claim 2, wherein a locking member is formed on the second layer, positioned adjacent to the base portion.

7. The multifunctional case as claimed in claim 6, wherein the locking member includes a head, and a slot is formed between the head and the second layer to lock one end of the portable electronic device.

8. The multifunctional case as claimed in claim 7, wherein the locking member includes a plurality of parallel bars protruding from the second layer.

9. The multifunctional case as claimed in claim 2, further comprising a flexible closing piece to close the opening.

10. The multifunctional case as claimed in claim 9, wherein the closing piece extends from the second layer adjacent to the opening.

11. The multifunctional case as claimed in claim 1, wherein the material of the first and the second layers is selected one of the groups of fiber, cotton, vinyl, thermoplastics.

12. A multifunctional case for receiving or supporting a portable electronic device, comprising:
    a first layer;
    a second layer connected to the first layer at edges, a receiving space formed between the first and second layers for receiving the portable electronic device; and
    a portion including a first folding area, two second folding areas and two third folding areas symmetrically positioned relative to a center line of the second layer; the first folding area being across the portion; the first folding area including a middle portion and two end portions; the two second folding areas parallel to each other and perpendicularly communicating with the middle portion of the first folding area; the two third folding areas communicating to the first folding area and the two second folding areas and positioned between the end portion and the second folding areas, each third folding area being at an acute angle with a corresponding second folding area;
    wherein when the case is folded up as a support, the two third folding areas are folded up and are at a same plane with the first folding area, the two second folding areas are folded up and are at the acute angle with the plane of the first folding area and the two third folding area.

13. The multifunctional case as claimed in claim 12, wherein an opening is formed to communicate to the receiving space, allowing the portable electronic to be inserted into the receiving space.

14. The multifunctional case as claimed in claim 13, wherein a locking member is formed on the second layer.

15. The multifunctional case as claimed in claim 14, wherein the locking member includes a head, and a slot is formed between the head and the second layer to lock one end of the portable electronic device.

* * * * *